United States Patent [19]
Pfister et al.

[11] Patent Number: 5,511,413
[45] Date of Patent: Apr. 30, 1996

[54] METHOD AND DEVICE FOR DETERMINING THE LOAD CONDITION OF PARTICLE FILTERS

[75] Inventors: Wolfgang Pfister; Walter Blaschke, both of Esslingen; Erwin Burner, Adelberg; Heinrich Wacker, Weilheim/Teck; Peter Steiner, Aichwald, all of Germany

[73] Assignee: J. Eberspächer, Esslingen, Germany

[21] Appl. No.: 118,021

[22] Filed: Sep. 8, 1993

[30] Foreign Application Priority Data

Sep. 9, 1992 [DE] Germany .......................... 42 30 180.7

[51] Int. Cl.⁶ .................................................. G01M 15/00
[52] U.S. Cl. ........................................... 73/118.1; 73/49.7
[58] Field of Search ................................ 73/118.1, 49.7; 55/270, 274; 60/286, 274

[56] References Cited

U.S. PATENT DOCUMENTS

| 3,817,099 | 6/1974 | Bubniak et al. ...................... 73/117.3 |
| 4,986,069 | 1/1991 | Barris et al. ............................ 60/286 |
| 5,211,009 | 5/1993 | Houben et al. ....................... 73/118.1 |

FOREIGN PATENT DOCUMENTS

| 3219947 | 12/1983 | Germany ............................... 60/286 |
| 3728713 | 3/1989 | Germany ............................... 60/286 |
| 0155522 | 9/1984 | Japan .................................... 60/286 |
| 0077717 | 3/1989 | Japan .................................... 60/286 |
| 0117911 | 5/1989 | Japan .................................... 60/288 |

Primary Examiner—Robert Raevis
Attorney, Agent, or Firm—McGlew and Tuttle

[57] ABSTRACT

A method and a device for determining the load condition of a particle filter (10) used in the exhaust gas system (11) of a diesel engine (12) employed in particular in a motor vehicle, wherein a pressure value ($\Delta P_{filter}$, $P_{abs.pre-filter}$ or $P_{rel.pre-filter}$) and a temperature value ($t_{m,filter}$) of the exhaust gas volume flow in the particle filter (12) are measured;

the engine speed (n) proportional to the volume flow is measured;

an actual characterizing value is calculated considering these measurement values; and a comparison between actual characteristic value (IK) and limit characteristic value (GK) is performed for initiating a regeneration process when the difference (DI) is sufficiently small.

18 Claims, 5 Drawing Sheets

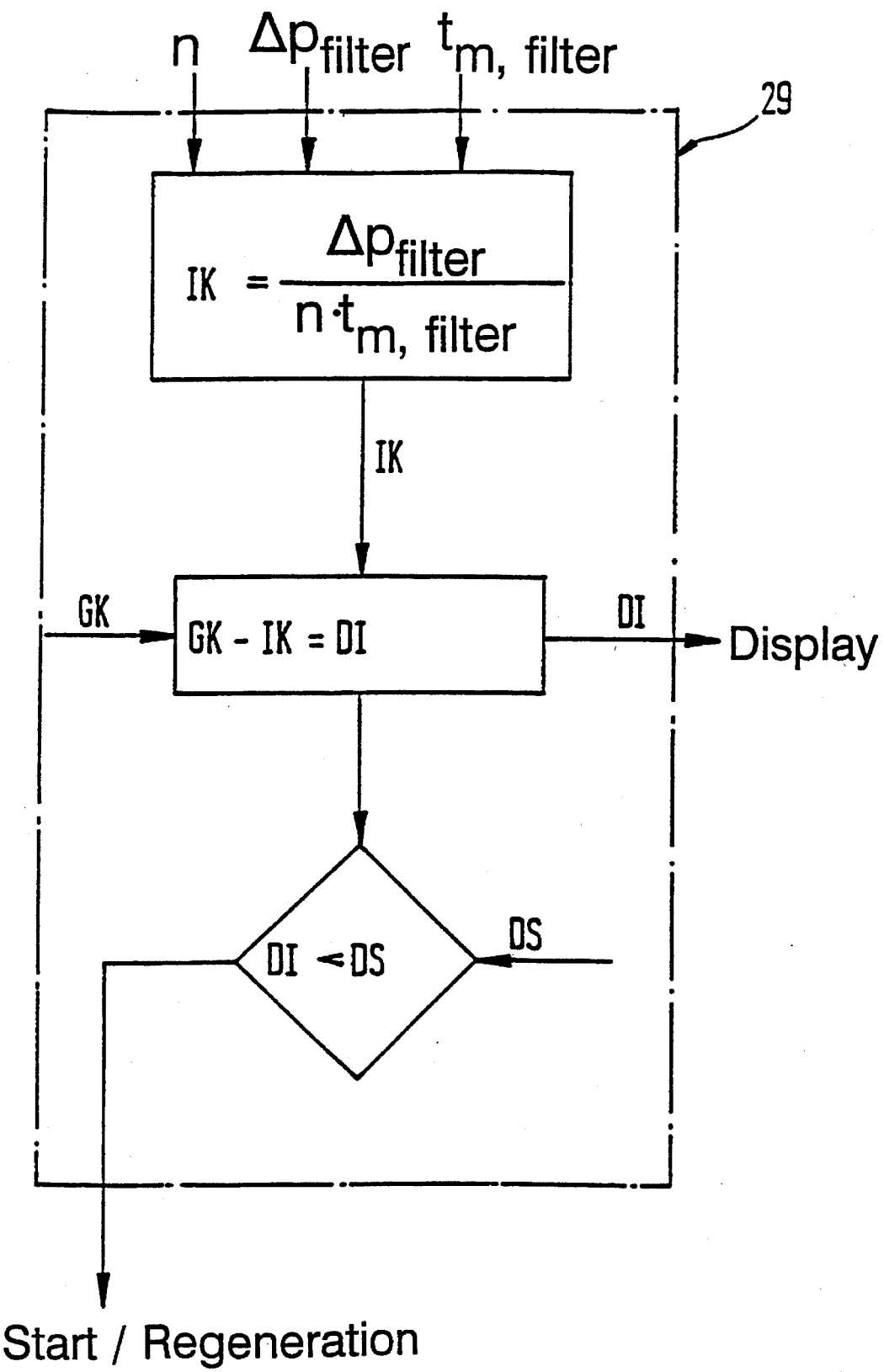

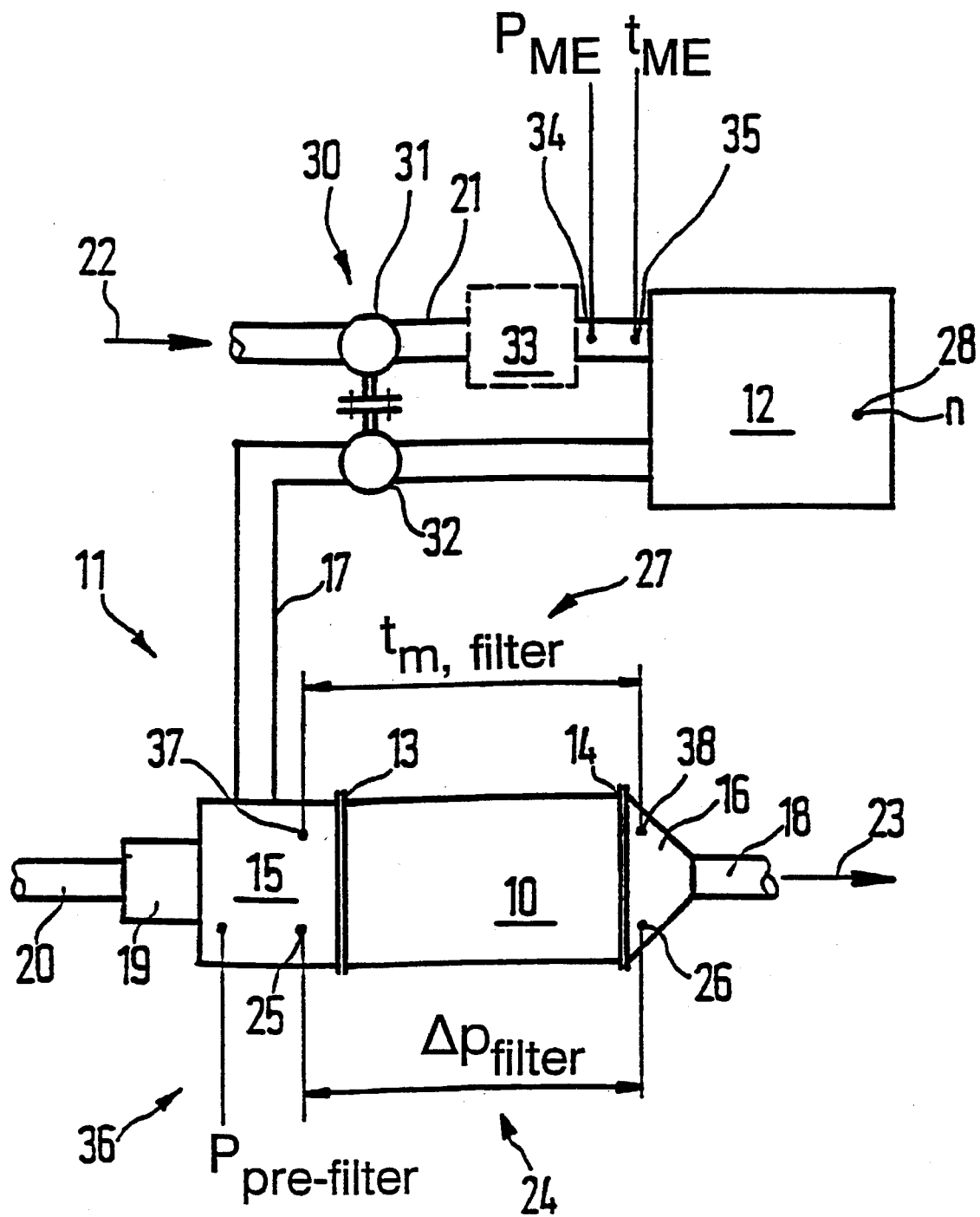

METHOD AND DEVICE FOR DETERMINING THE LOAD CONDITION OF PARTICLE FILTERS

FIELD OF THE INVENTION

The invention relates to a method of determining the load condition of a particle filter used in the exhaust gas system of a diesel engine employed in particular in a motor vehicle, and to a device for performing such method.

BACKGROUND OF THE INVENTION

The particle filters which are used increasingly for cleaning the exhaust gas in diesel engines and which, apart from filtering out other harmful gas constituents of the engine exhaust gas, serve in particular for filtering out soot particles contained in the exhaust gas, must be subjected to frequent cleaning (regeneration) for retaining their operability. In this respect especially the thermal regeneration of particle filters has turned out to be effective, in which the soot particles contained in the particle filter are ignited and burnt by the introduction of high-temperature heating gases (of approx. 600° C. to 900° C.).

For carrying out a thermal regeneration of particle filters, there are in essence three methods known, namely stationary regeneration, alternating regeneration and full flow regeneration. In case of a stationary regeneration, burning out of the particle filter takes place, while the vehicle engine is at a standstill by means of a heating means provided for this purpose and being independent of the engine. Alternating regeneration renders possible a thermal regeneration of the particle filter while the vehicle is in operation. To this end, two particle filters are connected in parallel, and in alternating manner one particle filter has engine gas flowing therethrough while a heating gas heated by the engine-independent heating means flows through the other particle filter, which is disconnected from the exhaust gas system, during the time of thermal regeneration. With full flow regeneration, in which the regeneration also takes place during operation of the vehicle, the particle filter is disposed permanently in the exhaust gas flow which is subjected during the time of regeneration to a heating gas flow which is produced by the engine-independent heating means and mixed with the engine exhaust gas and together with the latter is introduced into the particle filter for obtaining the afore-mentioned gas temperature necessary for regeneration.

Irrespective of the choice of the regeneration method performed, a thermal regeneration of course has to be carried out only when a certain load condition of the particle filter has been reached, in which either the filter has lost its effectiveness or in which the exhaust gas back pressure produced by the clogged filter has a disadvantageous effect on the engine power, or in which the filter, by further loading thereof, would be thermally destroyed during the next regeneration due to the heat set free in the combustion of soot.

As practical possibilities of continuously monitoring the load condition of a particle filter during operation are not yet known so far, certain fixed operational intervals are set by the manufacturers of particle filters, defining when a thermal regeneration is to be carried out. As the actual load condition is not known, the regeneration intervals are selected such that also under extreme operating conditions of the engine, such as frequent short-distance operation with extreme soot formation in the engine exhaust gases, there is provided sufficient security in the intervals for guaranteeing that the regeneration definitely can take place in due time before occurrence of the afore-described harmful effects. The regeneration of a particle filter in the case of operation of the engine with low soot formation thus necessarily takes place at a time at which such regeneration actually would not be necessary.

One has started to adapt the regeneration intervals in consideration of the predominantly prevailing operating conditions, such as e.g. short-distance or long-distance operation, the particular conditions of use of a particle filter, but even this refined pattern of the regeneration intervals turns out to be too coarse in practical application.

The generally known relationship between the pressure drop in a flow medium when flowing through a filter or the pressure increase in front of the filter, respectively, and the degree of clogging or loading of the filter, which as such holds only for filters having a constant flow therethrough, cannot be used alone for determining the load condition of a particle filter because of the predominantly varying operation of a combustion engine. Rather, for example the volume flow through the filter must be taken into consideration, which changes depending on the engine speed.

SUMMARY AND OBJECTS OF THE INVENTION

It is the object of the invention to provide a method and a device rendering possible a simple determination of the actually existing load condition of a particle filter in consideration of the particular engine operation conditions.

According to the invention, a method is provided for determining the load condition of a particle filter used in an exhaust gas system of a diesel engine, particularly a diesel engine employed in a motor vehicle. The method includes measuring at least one thermodynamic quantity of the exhaust gas volume flowing through the particle filter, the quantity being specific for the filter and measuring a quantity that is specific for the engine and proportional to the volume flowing through the engine. A characteristic value is calculated based on each of the two measurement values. A limit characteristic value is determined and an actual characteristic value is determined. The actual characteristic value is compared to the limit characteristic value in order to initiate a regeneration process when the difference between the actual characteristic value and the limit characteristic value is sufficiently small.

In the method according to the invention, the measurement of at least one thermodynamic quantity that is specific for the filter and defines the condition of the exhaust gas volume flow, and its association with a measured quantity that is specific for the engine and proportional to the volume flow, leads to the creation of a simple relationship between measurement values, which allows the determination of an actual characteristic value defining the load condition of the particle filter. By comparison with an empirically determined limit characteristic value, the deviation of the actual characteristic value from the limit characteristic value can be ascertained as a difference so that a regeneration process can be initiated, when the difference, which by definition may be a quantity between zero and an arbitrary value, is sufficiently small.

The limit value may be predetermined e.g. as a limit characteristic line ascertained during testing stand tests in consideration of various load conditions and volume flows. As a rule, the admissible limit value is defined depending on the extent of the admitted torque drop arising as a consequence of the exhaust gas back pressure caused by the particle filter in the exhaust gas system.

It turns out to be particularly reliable to ascertain the actual characteristic value when two quantities specific for the filter, namely a pressure value and a temperature value, as well as the engine speed as the value that is specific for the engine are measured.

It is advantageous to use the pressure upstream of the particle filter, i.e. the pre-filter pressure, or the pressure drop across the particle filter, i.e. the differential pressure measured at the particle filter, as the pressure value of the exhaust gas volume flow and to use the average volume flow temperature in the particle filter as the temperature value of the exhaust gas volume flow.

The invention further provides for the determination and processing of additional measurement values. This allows, in a particularly advantageous manner, the determination of the load condition of a particle filter disposed in a diesel engine equipped with an exhaust gas charging system. In addition to the specific filter quantities, namely the pressure in front of the particle filter, the pressure drop across the particle filter and the temperature of the exhaust gas volume flow in the particle filter, specific quantities of the charging volume flow, namely the temperature and the pressure of the charging volume flow, are taken into consideration as well in determining the actual characteristic value of the load condition.

When a sufficiently small difference between an actual characteristic value and a corresponding limit characteristic value is ascertained, preferably a display means is activated which, when the method according to the invention is used e.g. in a motor vehicle, informs the vehicle driver of the critical load condition of the particle filter. The driver then may initiate a regeneration of the particle filter according to one of the regeneration methods described hereinbefore.

A further possibility consists in coupling the display means with a start means for automatically initiating one of the afore-described regeneration methods, or in triggering the start means directly upon determination of a critical difference value, without prior display of the value.

When a display means is provided, it turns out to be particularly advantageous to display, either continuously or in predetermined time intervals, the actual characteristic value ascertained in the method according to the invention, starting from an initial characteristic value having a predetermined difference from the limit characteristic value, in order to thereby make the progression of the load condition visible from the outside, so that the necessity of performing a particle filter regeneration is recognizable in advance.

The device according to the invention for determining the load condition of a particle filter used in the exhaust gas system of a diesel engine employed in particular in a motor vehicle includes a differential pressure measuring means disposed in the region of the particle filter for sensing a pressure drop in the exhaust gas volume flow across the particle filter (a filter differential pressure) or a pressure measuring means disposed in front of the particle filter in measuring the pre-filter pressure. A temperature measuring means is provided for measuring the temperature of the exhaust gas volume flow in the particle filter. An engine quantity measuring means is provided for sensing a quantity that is specific to the engine and proportional to the volume flow. This quantity specific to the engine is preferably the engine speed. Computer means are provided for forming an actual characteristic value based on the measurement value sensed, by the differential pressure measuring means or the pressure measuring means, as well as the temperature measuring means and the engine quantity measuring means, as well as for comparing the actual characteristic value to a predetermined limit characteristic value. The device according to the invention can additionally comprise a display means which serves to display the reaching of the limit characteristic value and/or the difference between actual characteristic value and limit characteristic value as ascertained by the comparison in said computer means.

When the display means is designed such that it indicates merely that the limit characteristic value has been reached, this constitutes the signal for the vehicle driver to perform a regeneration process of the particle filter. When the difference between actual and limit characteristic values is indicated, the vehicle driver has the possibility of obtaining information continuously on the progression of the load condition and, to a certain extent, of determining himself the moment for performing a regeneration.

A modified embodiment of the device according to the invention can be provided, which permits a particularly advantageous application in determining the load condition of a particle filter disposed in the exhaust gas system of a charged diesel engine. In addition to the measuring means for measuring quantities specific for the filter, namely a differential pressure measuring means, a pressure measuring means for measuring means for measuring the pre-filter pressure and a temperature measuring means as well as a measuring means for ascertaining a quantity that is proportional to the volume flow, and specific for the engine, this modified embodiment is provided also with measuring means for measuring specific quantities of the charging volume flow, namely a temperature measuring means sensing the temperature of the charging volume flow, and a pressure measuring means sensing the pressure of the charging volume flow.

Both with the device according to the invention not involving a charged engine, which is particularly suited for use with an aspirating diesel engine, and with the modified device according to the invention, which is particularly suited for use with a charged diesel engine, it is possible to provide in addition to the display means, or instead of the same, a starting means which can be actuated depending on the difference between actual and limit characteristic values and effects starting of a regeneration means, in particular a burner means for thermal regeneration.

The method as well as the device according to the invention for determining the load condition of a particle filter will be elucidated in more detail hereinafter with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a flow diagram for illustrating the load condition determination of a particle filter disposed in the exhaust gas system of a diesel engine designed as aspirating engine;

FIG. 4 is a schematic view showing a particle filter installed between components of the exhaust gas system in a diesel engine provided with an exhaust gas charger, with measuring means being installed in the region of the engine and in the region of the particle filter;

DETAILED DESCRIPTION OF THE PREFERRED EMBODIMENT

Figure 1:
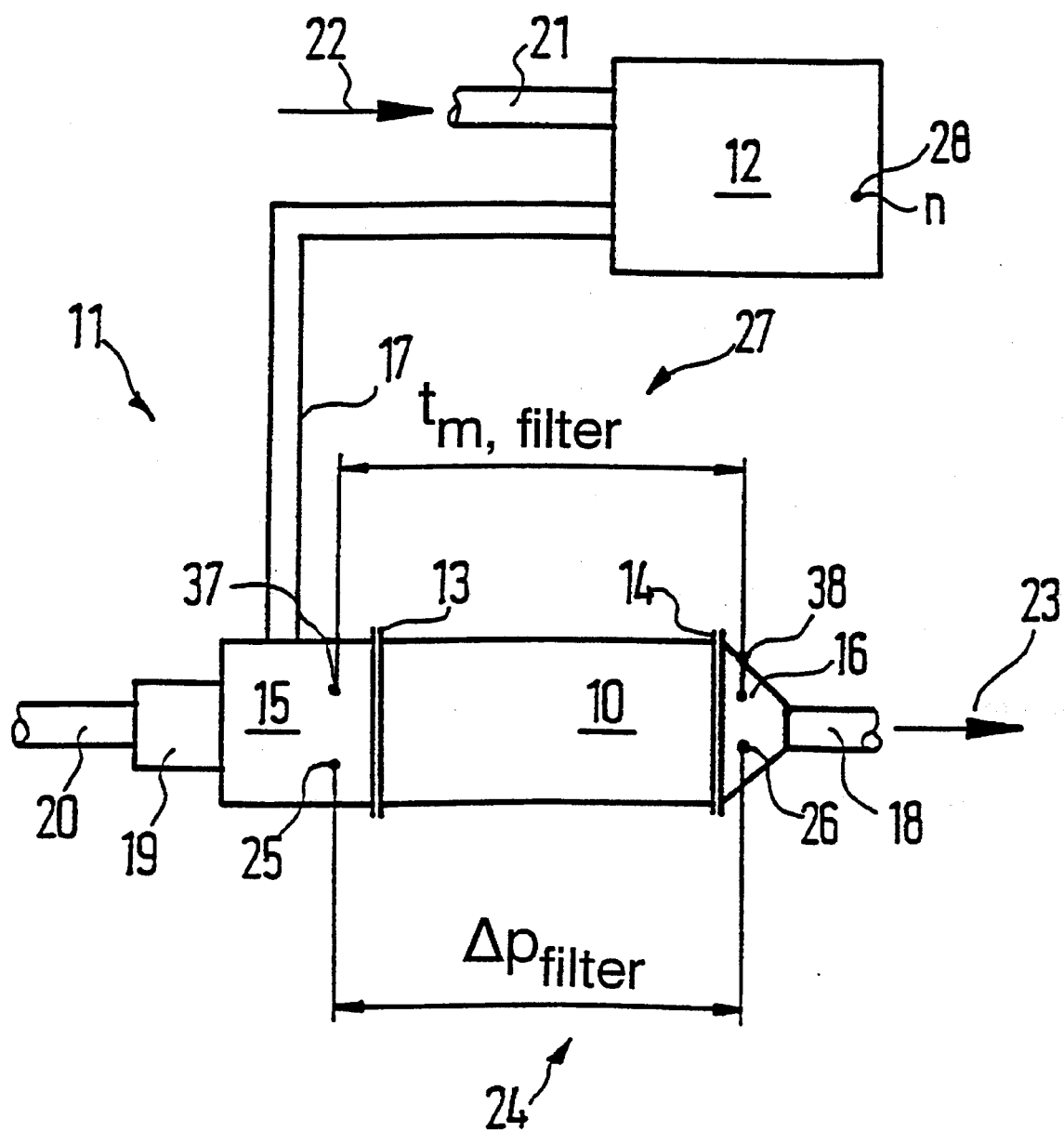
FIG. 1 is a schematic view showing a particle filter installed between components of an exhaust gas system in a diesel engine designed as aspirating engine, with measuring means being arranged in the region of the particle filter.

FIG. 1 shows a particle filter 10 disposed in an exhaust gas system 11 of a diesel engine 12 operated as an aspirating engine. The particle filter 10 is connected on its entrance side via flange connections 13, 14 to a pre-chamber 15 and on its discharge side to a reducer 16. The pre-chamber 15 is connected to the diesel engine 12 via an exhaust pipe 17. The reducer 16 merges on its downstream side with an exhaust pipe 18 through which the engine exhaust gases are discharged towards the free end of the exhaust gas system 11. All air flow 22 supplied to the diesel engine 12 through an intake line 21 is burnt in the system, schematically shown in FIG. 1 as the diesel engine 12, while fuel is supplied to the latter. The exhaust gases produced are discharged through the exhaust pipe 17, the pre-chamber 15, the particle filter 10, the reducer 16 and the following exhaust pipe 18 as well as through further exhaust gas system components, not shown, and are discharged into the open air as exhaust gas flow 23 after the soot components as well as other harmful components have been substantially filtered out from the exhaust gas flow.

For regeneration of the particle filter 10, there is provided a combustion chamber 19 which serves to heat a gas flow fed to said chamber through a supply means 20. For regeneration, the gas flow introduced through the supply means 20 is heated in the combustion chamber 19 for obtaining the exhaust gas temperature necessary for regeneration, and is mixed with the exhaust gas flow flowing through exhaust pipe 17 into pre-chamber 14.

Being able to determine the load condition of the installed particle filter, various measuring means are provided in the system shown in FIG. 1. In the region of the particle filter 10 there is provided a differential pressure measuring means 24 having two measuring sensors 25, 26 in the embodiment shown herein. Measuring sensor 25 is provided for measuring the pressure in the exhaust gas volume flow prior to entering the particle filter, and measuring sensor 26 is provided for measuring the pressure in the exhaust gas volume flow after exit thereof from the particle filter. The differential pressure measuring means 24 in total measures in known manner the differential pressure existing between the installation sites of the measuring sensors 25, 26 i.e. the pressure drop across the particle filter 10. In addition thereto, the measuring sensor 25 disposed upstream of the particle filter 10 serves to provide a description of the condition of the exhaust gas when entering the filter.

As a further measuring means in the region of the particle filter 10, there is provided a temperature measuring means 27 having measuring sensors 37, 38 and adapted to determine the average temperature of the exhaust gas volume flow in the particle filter 10. Finally, there is provided a speed measuring means or tachometer 28 connected to the diesel engine 12.

Figure 2:
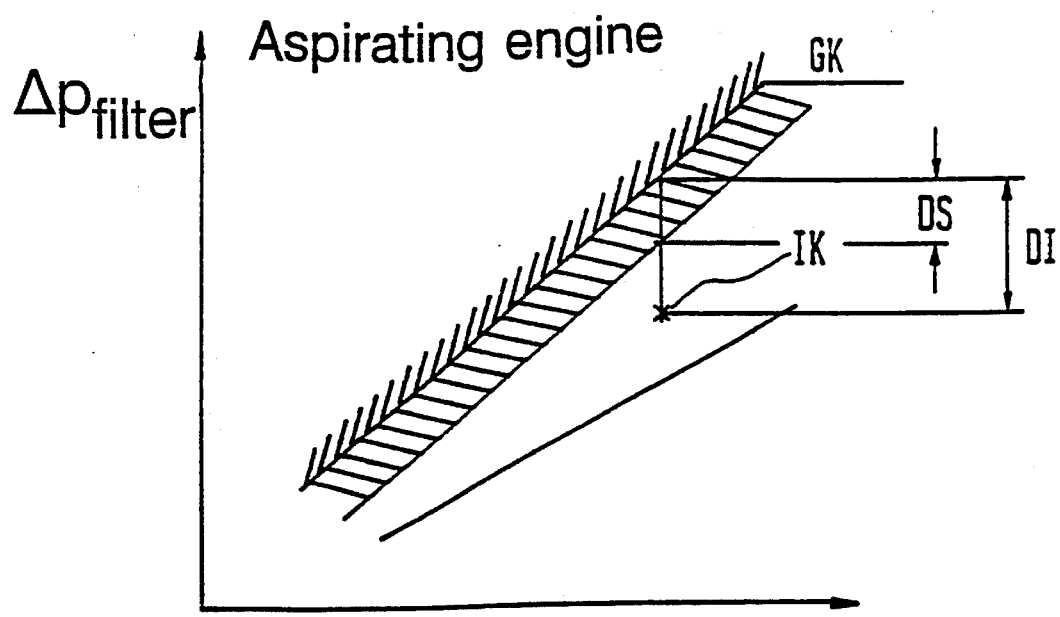
FIG. 2 is a diagram illustrating an exemplary characteristic line for the load condition of a particle filter arranged in the exhaust gas system of a diesel engine designed as aspirating engine.

It has been found out that the relationship illustrated in FIG. 2 exists between the quotient of the filter differential pressure $\Delta p_{filter}$ determined by the differential pressure measuring means 24 and the average filter temperature $t_m$ determined by the temperature measuring means 27 as well as the speed of the diesel engine 12 which is proportional to the volume flow and determined via the speed measuring means 28. The upper graphical representation of the two representations shown in FIG. 2 indicates the limit characteristic value for the load condition of the particle filter, which is defined to be constant by the gradient of the graph. This limit characteristic value GK may be ascertained e.g. in tests performed on a testing stand, the limit characteristic value for the load condition of the particle filter being fixed e.g. depending on the admissible power loss of the diesel engine as a result of clogging of the particle filter with soot particles and the like.

The second, lower graph shows the unloaded condition of the particle filter, as compared to the maximum admissible load condition represented by the upper graph.

Due to the relationship found out between the thermodynamic quantities $\Delta p_{filter}$ and the engine speed n, as shown in FIG. 2, it is thus possible, by comparing an operating point defined by the quantities mentioned with the admissible load GK, to find out whether the maximum admissible load condition has been reached or how far the actual load condition of the particle filter defined by the operating point is away from the admissible load condition.

The relationship with the filter differential pressure $\Delta p_{filter}$ as load indication means, as shown in FIG. 2 and further below in FIG. 5, holds also when, instead of the filter differential pressure $\Delta p_{filter}$, the absolute pressure or the relative to atmospheric pressure in front of the filter are utilized as load indication means.

An actual characteristic value IK defining the actual load condition, i.e. the operating point of the particle filter, is shown in exemplary manner in FIG. 2. As shown furthermore in FIG. 2, there is an actual difference DI present at this operating point of the particle filter between the limit characteristic value GK and the actual characteristic value IK. The maximum load condition thus has definitely not yet been reached in this point. This means that a regeneration of the particle filter need not be started yet. This needs to be done only when the actual characteristic value IK is equal to the limit characteristic value GK. As it may also turn out to be advantageous in some cases to initiate the regeneration process already before the maximum admissible load condition defined by the limit characteristic value GK has been reached, or at least, before occurrence of the maximum load condition, to obtain information on the imminent occurrence of the maximum load condition, it turns out to be advantageous, in particular when the currently present load condition is shown on a display means, to define a tolerance region (shown in hatched manner in FIG. 2) across a nominal difference DS between the limit characteristic value GK and the actual characteristic value IK. In case DI is equal to DS, regeneration of the particle filter can be initiated or the necessity for a soon required regeneration of the particle filter can be displayed, respectively.

FIG. 3 shows by way of a flow diagram a possible manner of performing the method of determining the load condition of a particle filter disposed in the exhaust gas system of a diesel engine operated as aspirating engine. The thermodynamic quantities $\Delta p_{filter}$ and $t_{m,filter}$ as well as the engine speed n proportional to the volume flow, which have been ascertained by the measuring means 24, 27, 28 shown in FIG. 1, are supplied to a computer means 29. The computer means 29 first performs a calculation of the actual characteristic value from the quotient of the filter differential pressure $\Delta p_{filter}$ and the product of the engine speed n and the average filter temperature $t_{m,filter}$. Subsequent thereto, the actual difference DI between the calculated actual characteristic value GK is established and displayed.

According to the representation of FIG. 3, after calculation of the actual difference DI, an examination is made whether the actual difference DI is smaller than a predetermined nominal difference DS. In case this is so, the regeneration means is put into operation thereafter, i.e. the combustion chamber 19 shown in FIG. 1 is put into operation.

It is of course also possible to perform the comparison not after calculation of the actual difference DI, but to compare the actual characteristic value IK directly to the limit characteristic value and to initiate the regeneration process upon detection that the characteristic values are identical or that the limit characteristic value GK is exceeded.

FIG. 4 shows a particle filter 10 disposed in an exhaust gas system of a diesel engine 12 provided with an exhaust gas charger 30. The components of the exhaust gas system 11 depicted in FIG. 4 and identical to those of FIG. 1 have the same reference numerals as in FIG. 1. As a difference from the system shown in FIG. 1, the system of FIG. 4 has the exhaust gas charger 30 disposed upstream of the diesel engine 12. The exhaust gas charger 30 consists in essence of a compressor 31 disposed in the intake line 21 and driven via an exhaust gas turbine 32 coupled to the compressor 31 and disposed in exhaust pipe 17. An intermediate cooling means 33 may optionally be provided in intake line 21 between the compressor 31 of the exhaust gas charger 30 and the entrance to the diesel engine 12.

In addition to the measuring means already provided in the system according to FIG. 1, namely the differential pressure measuring means 24, the speed measuring means 28 and the temperature measuring means 27, the system illustrated in FIG. 4 is provided with further measuring means. In intake line 21, immediately upstream of the entrance to the engine, there are provided on the one hand a pressure measuring means 34 for measuring the pressure in the volume flow at the engine entrance $P_{ME}$ and a temperature measuring means 35 for measuring the temperature $t_{ME}$ of the volume flow 22 entering the diesel engine 12. In a simplified embodiment, the temperature measuring means 35 may also be omitted. In addition thereto, a pressure measuring means 36 measuring the pre-filter pressure $P_{pre-filter}$ disposed in the entrance region of the exhaust gas volume flow into the particle filter 10, in the present embodiment in the pre-filter chamber 15. The pressure measuring means 36 of course may also be formed by the measuring sensor 25 of the differential pressure measuring means 24, so that the pressure measuring means 36 so to speak forms part of the differential pressure measuring means 24.

Figure 5:
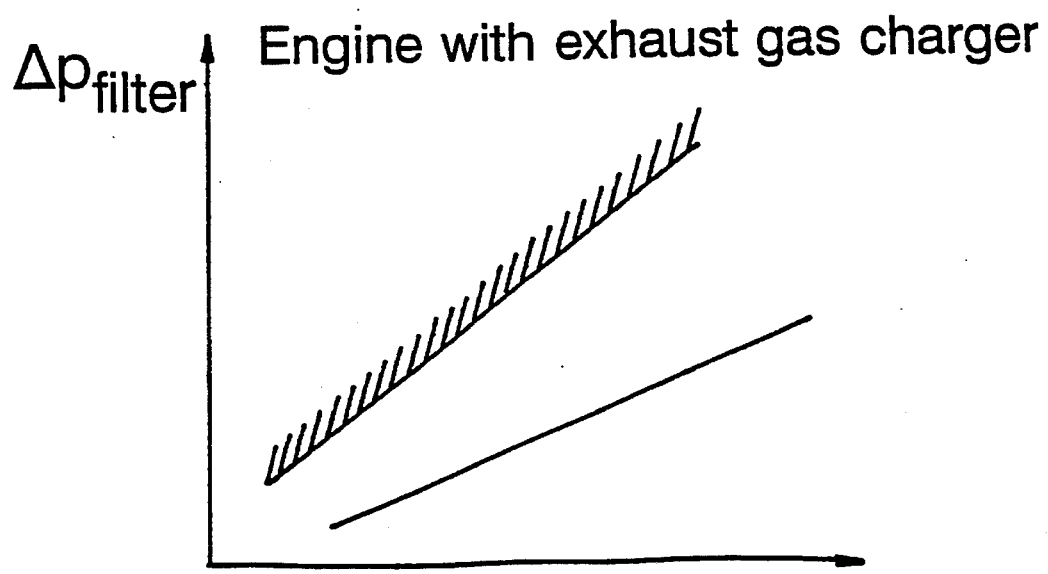
FIG. 5 is a diagram illustrating all exemplary characteristic line of the load condition of a particle filter disposed in the exhaust gas system of a diesel engine provided with an exhaust gas charger.

The diagram shown in FIG. 5 illustrates the established linear relationship between the filter differential pressure $\Delta p_{filter}$ and the average filter temperature $t_{m,filter}$ as well as the volume flow introduced into the diesel engine. Due to the compression of the volume flow introduced into the diesel engine 12, as effected by the exhaust gas charger 30, the quantity proportional to the volume flow shown in FIG. 5 along the abscissa is not solely dependent on the speed (as shown in FIG. 2), but is also determined by the quotient of the engine entrance pressure $P_{ME}$ and the product of engine entrance temperature $t_{ME}$ and pre-filter pressure $P_{pre-filter}$.

As for the rest the same relationships hold in FIG. 5 as those depicted in FIG. 2 with respect to the limit characteristic value GK, the actual characteristic value IK, the nominal difference DS and the actual difference DI.

Figure 6:
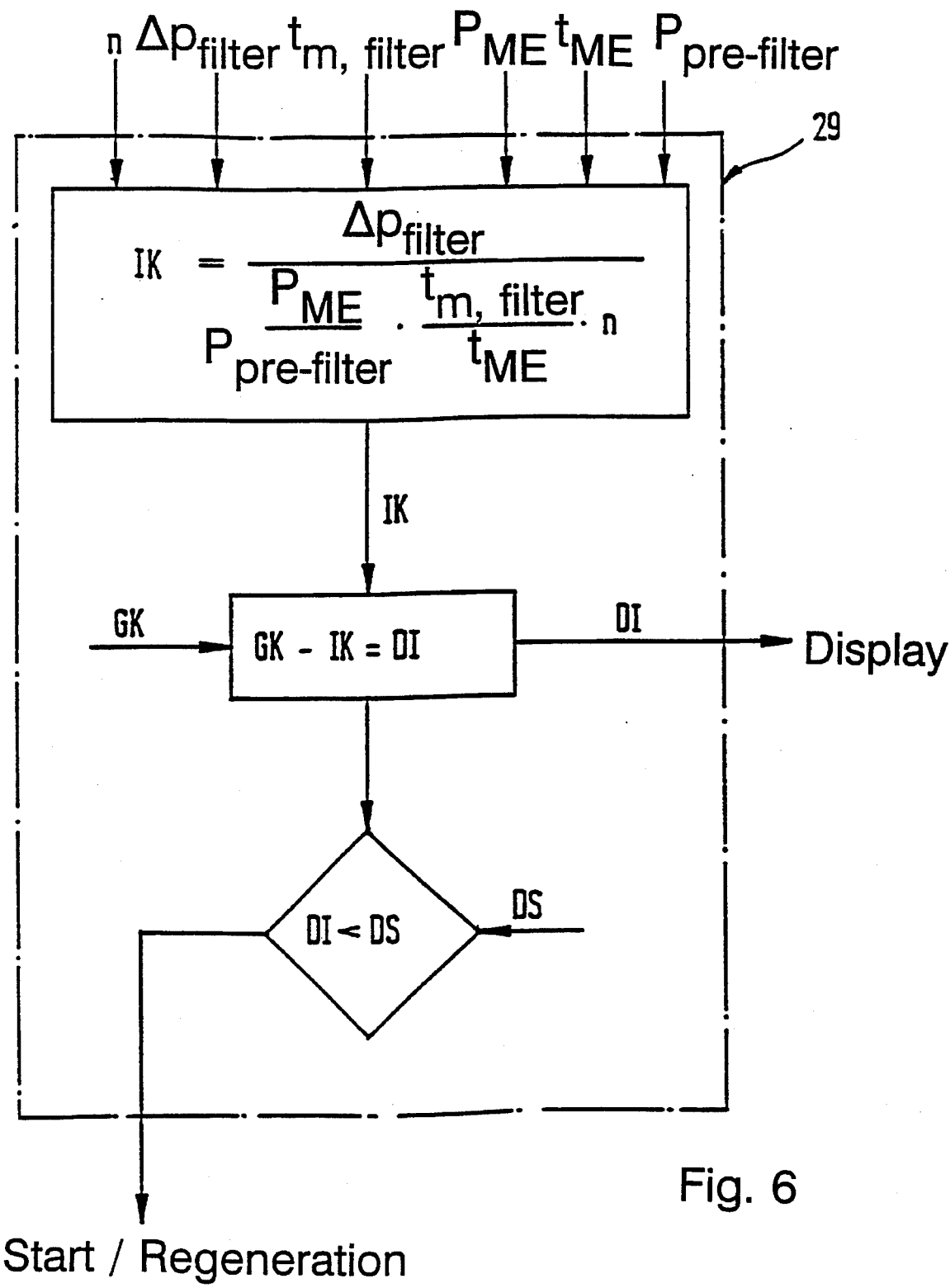
FIG. 6 is a flow diagram for illustrating the load condition determination in a particle filter disposed in the exhaust gas system of a diesel engine provided with an exhaust gas charger.

FIG. 6 shows by way of a flow diagram a possible manner of carrying out a method of determining the load condition of a particle filter disposed in the exhaust gas system of a diesel engine provided with an exhaust gas charger. The measuring values ascertained by the measuring means shown in FIG. 4, namely the engine speed n, the filter differential pressure $\Delta p_{filter}$, the average filter temperature $t_{m,filter}$, the engine entrance pressure $P_{ME}$, the engine entrance temperature $t_{ME}$ and the pre-filter pressure $p_{pre-filter}$, are first fed to the computer means 29. Thereafter, the calculating operation shown in FIG. 6 is carried out for calculating the actual characteristic value IK.

The further sequence shown in FIG. 6 corresponds to that shown in FIG. 3 after calculation of the actual characteristic value IK, so that reference is made to the description of FIG. 3 for further elucidation.

While specific embodiments of the invention have been shown and described in detail to illustrate the application of the principles of the invention, it will be understood that the invention may be embodied otherwise without departing from such principles.

What is claimed is:

1. A method for determining a load condition of a particle filter used in an exhaust gas system of a diesel engine, the method comprising the steps of:

measuring a pressure of an exhaust gas flow adjacent an upstream side of the particle filter;

measuring a temperature of the exhaust gas flow in the particle filter;

measuring a speed of rotation of the diesel engine;

calculating an actual characteristic value from said measured pressure upstream of said particle filter, said temperature, and said speed of rotation of the diesel engine;

determining a limit characteristic value representing a load condition of the particle filter resulting in an unacceptable power loss of the diesel engine; and comparing the actual characteristic value with the limit characteristic value and carrying out a regeneration process on the particle filter when a difference between the characteristic value and the limit characteristic value is sufficiently small;

said calculating of said actual characteristic value uses pressure values from only the upstream side of the particle filer.

2. A method according to claim 1, wherein:
   in a case of said diesel engine being provided with an exhaust gas charger, a pressure value and a temperature value of a charging volume flow, are measured in addition to form said actual characteristic value.

3. A method according to claim 1, wherein:
   upon said sufficiently small difference between said actual characteristic value and said limit characteristic value, a display means is actuated and a starting means for starting a regeneration process is actuated.

4. A method according to claim 3, wherein:

said display means displays a progressing load condition until the limit characteristic value is reached, starting from an initial characteristic value having a defined difference from said limit characteristic value.

5. A method according to claim 1, wherein:

said measuring of said temperature of the exhaust gas flow in the particle filter is an average volume flow temperature in the particle filter.

6. A method according to claim 5, wherein:

said measuring of said average temperature is performed by the steps of measuring a temperature of the exhaust gas flow on the upstream side of the particle filter and on a downstream side of the particle filter.

7. A method according to claim 1, further comprising:

providing an exhaust gas charger for supplying charging gas to the engine;

measuring a pressure and a temperature of the charging gas downstream of said exhaust gas charger and upstream of said engine;

calculating said actual characteristic value using also said measured pressure and temperature of the charging gas.

8. A method according to claim 1 wherein:

said calculating of said actual characteristic value is by the formula $$P/nt_m$$

where:

P=said measured pressure upstream of said particle filter, $t_m$=said temperature, and n=said speed of rotation of the diesel engine.

9. A method for determining a load condition of a particle filter used in an exhaust gas system of a diesel engine with an exhaust gas charger, the method comprising the steps of:

measuring a pressure of all exhaust gas flow adjacent an upstream side of the particle filter;

measuring a temperature of the exhaust gas flow in the particle filter;

measuring a speed of rotation of the diesel engine;

measuring a pressure and a temperature of a charging gas downstream of the exhaust gas charger and upstream of the engine;

calculating an actual characteristic value from said measured pressure upstream of said particle filter, said temperature, said speed of rotation of the diesel engine, and said measured pressure and temperature of the charging gas;

determining a limit characteristic value representing a load condition of the particle filter resulting in an unacceptable power loss of the diesel engine; and comparing the actual characteristic value with the limit characteristic value and carrying out a regeneration process on the particle filter when a difference between the characteristic value and the limit characteristic value is sufficiently small.

10. A method according to claim 9, wherein:

said calculating of said actual characteristic value is by the formula $$P/[(P_{me}/P) (t_m/t_{me}) n]$$

where:

P=said measured pressure upstream of said particle filter, $P_{me}$=said pressure of the charging gas, $t_m$=said temperature of said exhaust gas flow, $t_{me}$ said temperature of the charging gas; and n=said speed of rotation of the diesel engine.

11. A device for determining a load condition of a particle filter used in an exhaust gas system of a diesel engine with an exhaust gas charger, the device comprising:

a pressure measuring means disposed in front of the particle filter for measuring a pre-filter pressure;

temperature measuring means for measuring a temperature of said exhaust gas flow in the particle filter;

tachometer means for measuring a speed of rotation of the engine: and means for measuring a pressure and a temperature of a charging gas downstream of the exhaust gas charger and upstream of the engine;

computer means for forming an actual characteristic value based on said pre-filter pressure, said temperature of the exhaust gas flow, said speed of rotation of the engine, and said measured pressure and temperature of the charging gas, said computer means receiving a predetermined limit characteristic value and comparing said actual characteristic value to said predetermined limit characteristic value.

12. A device according to claim 11, wherein:

said computer means forms said actual characteristic value by the formula $$P/[(P_{me}/P) (t_m/t_{me}) n]$$

where:

P=said pre-filter pressure, $P_{me}$=said pressure of the charging gas, $t_m$=said temperature of said exhaust gas flow, $t_{me}$=said temperature of the charging gas; and n=said speed of rotation of the engine.

13. A device for determining a load condition of a particle filter used in an exhaust gas system of a diesel engine, comprising:

pressure measuring means disposed in front of the particle filter for measuring a pre-filer pressure;

temperature measuring means for measuring a temperature of an exhaust gas flow in the particle filter;

tachometer means for measuring a speed of rotation of the engine;

computer means for forming an actual characteristic value based on said prefilter pressure, said temperature of said exhaust gas and said engine speed, said computer means also including a predetermined limit characteristic value and comparing said actual characteristic value to said predetermined limit characteristic value;

charging volume flow temperature measuring means for sensing a temperature of a charging volume flow;

charging volume flow pressure measuring means for sensing a pressure of said charging volume flow.

14. A device according to claim 13, further comprising:

display means for displaying said limit characteristic value and/or a difference between said actual characteristic value and said limit characteristic value.

15. A device according to claim 14, further comprising:

regeneration means for regenerating said particle filter and including a burner for thermal regeneration;

starting means for starting said regeneration means, said starting means being connected to said computer means for operation as a function of said difference between said actual characteristic value and said limit characteristic value.

16. A device according to claim 13, further comprising:

regeneration means for regenerating said particle filter and including a burner for thermal regeneration;

starting means for starting said regeneration means, said starting means being connected to said computer means for operation as a function of said difference between said actual characteristic value and said limit characteristic value.

17. A device according to claim 13, wherein:

said temperature means includes sensors measuring a temperature of the exhaust gas flow on the upstream side of the particle filter and on a downstream side of the particle filter and said temperature means calculates an average temperature of the exhaust gas in the particle filter.

18. A device according to claim 13, wherein:

said computer means forms said actual characteristic value by the formula $$P/n \, t_m$$

where:

P = said pre-filter pressure, $t_m$ = said temperature of said exhaust gas flow, and n = said speed of rotation of the engine.

* * * * *